(12) United States Patent
Hamilton

(10) Patent No.: US 8,228,360 B2
(45) Date of Patent: Jul. 24, 2012

(54) SYSTEM, METHOD AND COMPUTER PROGRAM FOR PROVIDING SCALABILITY IN TWO OR MORE STREAMING AND/OR ARCHIVING SYSTEMS FOR VIDEO CONFERENCE CALLS

(75) Inventor: David Hamilton, Hamilton (NZ)

(73) Assignee: Cisco Technology, Inc., San Jose, CA (US)

( * ) Notice: Subject to any disclaimer, the term of this patent is extended or adjusted under 35 U.S.C. 154(b) by 1335 days.

(21) Appl. No.: 11/862,851

(22) Filed: Sep. 27, 2007

(65) Prior Publication Data

US 2008/0084470 A1 Apr. 10, 2008

(30) Foreign Application Priority Data

Sep. 27, 2006 (NO) .................................... 20064369

(51) Int. Cl.
*H04N 7/14* (2006.01)
(52) U.S. Cl. ................................. 348/14.01; 348/14.09
(58) Field of Classification Search .... 348/14.01–14.09; 709/204
See application file for complete search history.

(56) References Cited

U.S. PATENT DOCUMENTS

| | | | |
|---|---|---|---|
| 6,195,680 B1 | 2/2001 | Goldszmidt et al. | |
| 6,337,881 B1 | 1/2002 | Chaddha | |
| 7,136,062 B1 | 11/2006 | Butler | |
| 2002/0154691 A1 | 10/2002 | Kost et al. | |
| 2003/0058805 A1 | 3/2003 | Meyerson et al. | |
| 2003/0058806 A1 | 3/2003 | Meyerson et al. | |
| 2003/0223562 A1 | 12/2003 | Cui et al. | |
| 2005/0283818 A1* | 12/2005 | Zimmermann et al. | 725/134 |

FOREIGN PATENT DOCUMENTS

| | | |
|---|---|---|
| WO | WO 01/26381 | 4/2001 |
| WO | WO 02/096115 | 11/2002 |

OTHER PUBLICATIONS

Schroeder, et al., Goddard and Ramamurthy (University of Nebraska-Lincoln): "Scalable Web Server Clustering Technologies", XP001195395, May/Jun. 2000, pp. 38-45.

* cited by examiner

*Primary Examiner* — Curtis Kuntz
*Assistant Examiner* — Sunita Joshi
(74) *Attorney, Agent, or Firm* — Oblon, Spivak, McClelland, Maier & Neustadt, L.L.P.

(57) ABSTRACT

The present invention is a method and system for clustering two or more video conferencing recording/streaming devices, making the cluster of two or more devices appear as one single device for the user. One of the recording/streaming devices acts as a cluster controller and provides a user interface to the users. System settings are propagated to the other recording/streaming devices in the cluster from the cluster controller. A load balancing system controls incoming and outgoing calls, distributing the computational load amongst the recording/streaming devices evenly.

23 Claims, 13 Drawing Sheets

SYSTEM, METHOD AND COMPUTER PROGRAM FOR PROVIDING SCALABILITY IN TWO OR MORE STREAMING AND/OR ARCHIVING SYSTEMS FOR VIDEO CONFERENCE CALLS

CROSS REFERENCE TO RELATED APPLICATIONS

This application claims priority to Norwegian Patent Application No. 20064369, filed on Sep. 27, 2006. The contents of this document are incorporated herein by reference.

BACKGROUND OF THE INVENTION

1. Field of the Invention

The present invention relates to videoconferencing and streaming/archiving systems.

2. Description of the Background

To have a meeting among participants not located in the same area, a number of technological systems are available. These systems may include videoconferencing, web conferencing or audio conferencing.

The most realistic substitute of real meetings is high-end videoconferencing systems. Conventional videoconferencing systems comprise a number of end-points communicating real-time video, audio and/or data over WAN, LAN and/or circuit switched networks. The end-points include one or more monitor(s), camera(s), microphone(s) and/or data capture device(s) and a codec, which encodes and decodes outgoing and incoming data, respectively. In addition, a centralized source, known as a Multipoint Control Unit (MCU), is used to link the multiple end-points together. The MCU performs this linking by receiving the multimedia signals (audio, video and/or data) from end-point terminals over point-to-point connections, processing the received signals, and retransmitting the processed signals to selected end-point terminals in the conference.

By using a videoconferencing system, e.g. a PowerPoint presentation or any other PC-presentation may be presented while still being able to see and hear all the other participants.

In an end-to-end visual communications solution it is advantageous for video conferences to be made available to wider audiences which may have entirely different time constraints. An example of this is an important meeting or announcement that needs to be available to all employees in a multinational company. This involves multiple time zones and many scheduling conflicts. A solution to this is a video conferencing recording and streaming system that can record video conferences for delivery at a time of the viewers choosing. For people who don't need to be directly involved in the conference the system can also stream it live as it is happening. The delivery method referred to here is streaming over the Internet or another local or wide-area network. One skilled in the art knows that streaming is preferred way to present live feeds and support broadcasts and multicasts (sending one stream to many viewers). In streaming, a user's machine plays data as it is received and may or may not then discard it. One of the primary goals of streaming video is to maintain real-time playback at various connection speeds. To make this possible, streaming media relies on different protocols and servers for delivery than are used for delivery of standard Web pages. Real-time Protocol (RTP) and Real-time Streaming Protocol (RTSP) are known as connectionless protocols, in which speed is more highly valued than accuracy. Streaming servers reduce bandwidth overhead by broadcasting data across a network without verifying whether it is actually received. RTP and RTSP, as well as other existing or proposed streaming protocols are within the scope of the present invention.

Presenting multimedia content by streaming data to computers through a web interface is well known. The data stream may be transmitted in real-time, or a play back of an archived content through a streaming and/or archiving system. Conventional streaming data is adapted for storage and distribution, and therefore the multimedia content is represented in a different format than for video conferencing. Hence, to allow for streaming and archiving of a conventional video conference, a system for converting the multimedia data is needed.

A streaming and/or archiving system for video conference calls is preferably provided with a network interface for connecting the device to a computer network, audio/video and presentation data interfaces for receiving conference content, a file conversion engine for converting presentation content into a standard image format for distribution, and a stream encoder for encoding the content into streaming format for distribution. The streaming and/or archiving system is further equipped with a stream server for transmitting the encoded audio/video content and a web server for transmitting web pages and converted presentation content to terminals located at nodes of the network. The streaming and/or archiving system is also adapted to create an archive file consisting of the encoded stream data, residing at local storage media or in a server/database, to enable later on-demand distribution to requesters at remote terminals over the computer network.

However, streaming and/or archiving system as discussed above have limited amount of resources. Whether it is implemented in software or hardware there will be a maximum amount of simultaneous video conferences the device can handle. This number is inversely related to the complexity of the recording/streaming task. That is, the more CPU intensive the recording and streaming tasks, the less of them the system will be able to handle simultaneously. In many cases however, these kinds of CPU intensive tasks produce more desirable outputs. For example encoding normal and extended video sources into a streaming format such as Windows Media is resource intensive, but produces an output that can be delivered to a large number of people over a range of bandwidths and without the need for additional plug-ins or codecs to be installed on client computers.

Deployment of a videoconference distribution device in large installations may require many more simultaneous outputs than a single device can produce. Adding more systems to increase resources is a logical step, but also increases the complexity of dealing with the total solution. All devices must be managed separately, so carrying out administration tasks for each of the deployed standalone devices involves a duplication of effort on the part of the administrative users. Each standalone device has its own Graphical User Interface (GUI) which increases the probability of end users trying to access the wrong interface to perform routine tasks, such as creating and gaining access to the recorded/streamed content.

One way to deal with multiple standalone streaming and/or archiving systems (1, 2, 3) is to have an intermediate management system (4) that manages the interaction between all the standalone devices (1, 3, 3) and for providing a common user interface 5 for the user, as shown in FIG. 1. However, this requires a separate system (4) altogether and provides one point of failure. In addition, the streaming and/or archiving systems (1, 2, 3) are still treated as individuals by the video conference systems (not shown). Each of the streaming and/or archiving systems (1, 2, 3) has its own addresses, and a user must know several different addresses to connect to in order to utilize all of the streaming and/or archiving systems (1, 2, 3). Further, if the first streaming and/or archiving system (e.g. 1) dialled by the user is out of resources and unable to handle the call, the user must start all over and dial one of the other streaming and/or archiving systems (e.g. 2 or 3).

Hence, current solutions involve managing all systems independently, or using another external control system to manage them all. The disadvantage to this is that the task of interacting with and administering the devices becomes more complex and time consuming as the number of devices increases.

SUMMARY OF THE INVENTION

It is an object of the present invention to provide a system and a method solving at least one of the above-mention problems in prior art.

Thus, the present invention relates at least to a system, method and computer program for providing scalability in two or more streaming and/or archiving systems for conference calls operatively connected over a packed switched network. The system includes the two or more streaming and/or archiving systems having at least one identical alias as receiver and sender identification, and a system control device. The system control device includes comprising a control unit and a database, and is configured a) to provide a user interface, and b) at first predefined events, propagate system settings and/or parameters to said streaming and/or archiving systems. The system also includes a load balancing system configured to receive capacity status reports from said two or more streaming and/or archiving systems at second predefined events, and to decide which of the two or more streaming and/or archiving systems to stream and/or record a conference call, based on the capacity status reports. The method includes steps of, at first predefined events, propagating system settings and/or parameters to said streaming and/or archiving systems, and load balancing by deciding which of two or more streaming and/or archiving systems to stream and/or record a conference call, based on received capacity status reports.

BRIEF DESCRIPTION OF THE DRAWINGS

In order to make the invention more readily understandable, the discussion that follows will refer to the accompanying drawings.

Figure 9C:
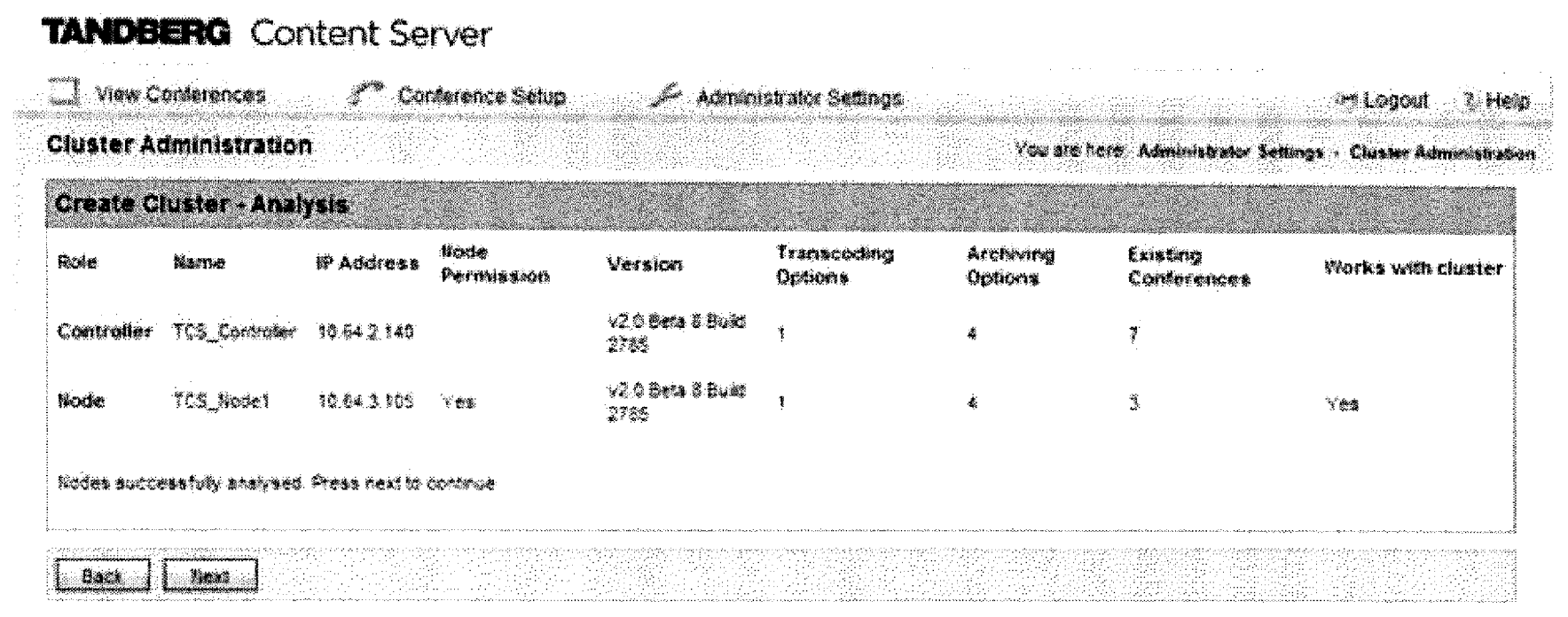
Figure 9D:
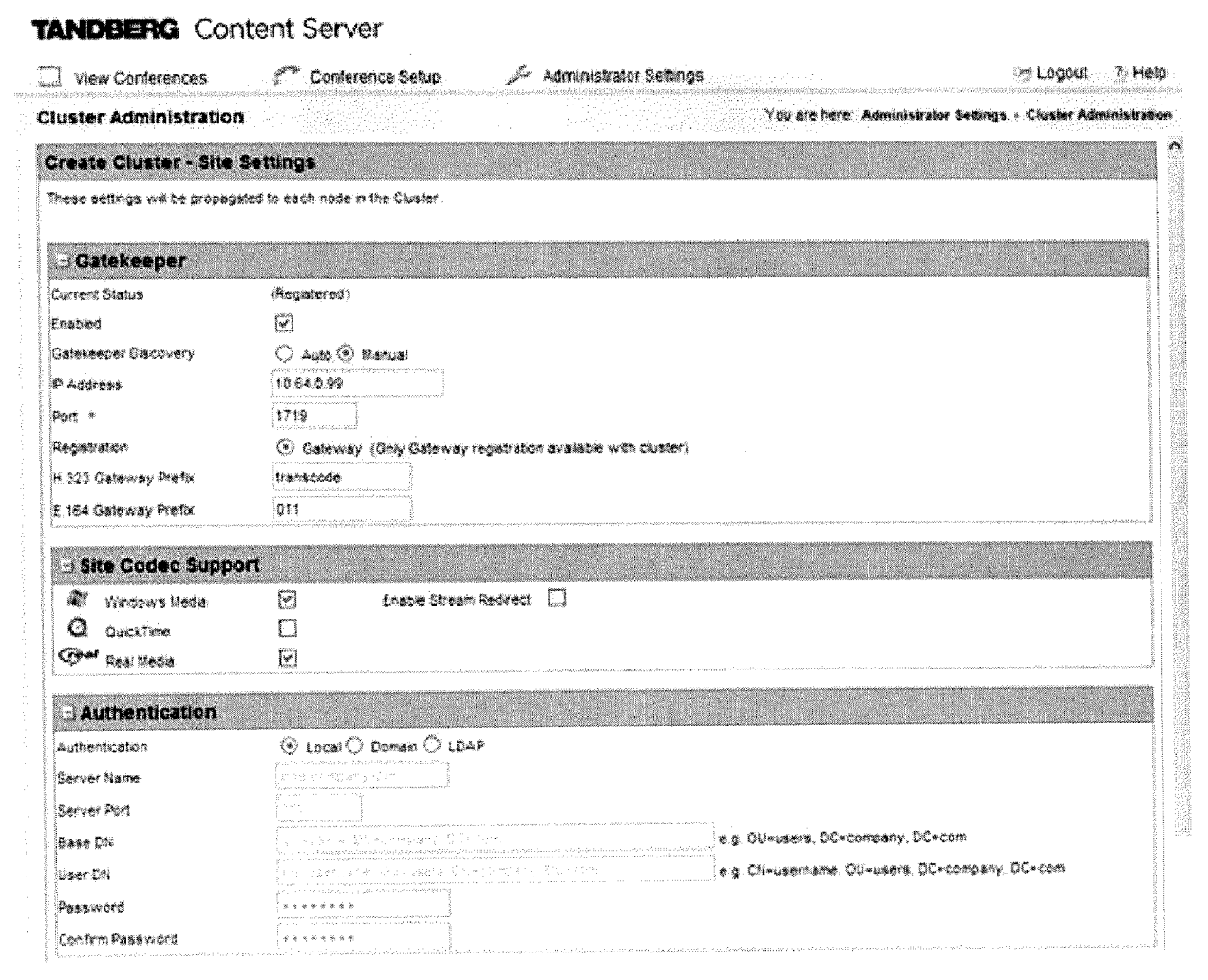

FIGS. 9A-9D are screen shots of a GUI according to one embodiment of the invention.

DETAILED DESCRIPTION THE INVENTION

In the following, the present invention will be discussed by describing a preferred embodiment, and by referring to the accompanying drawings. However, people skilled in the art will realize other applications and modifications within the scope of the invention as defined in the enclosed independent claims.

The present invention is a method and system for clustering two or more video conferencing recording/streaming devices, making the cluster of two or more devices appear as one single device for the user.

Figure 1:
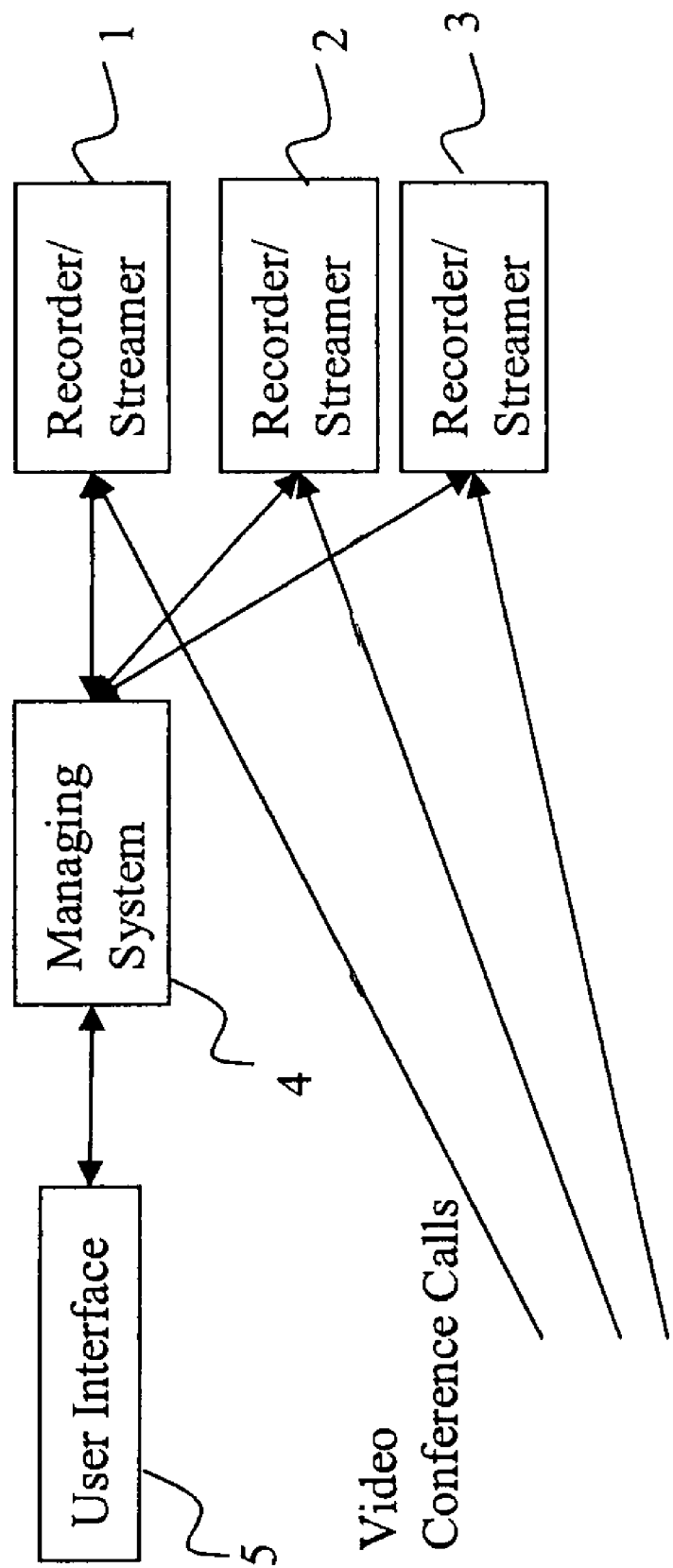
FIG. 1 is a block diagram illustrating an intermediate managing system for managing a plurality of streaming and/or archiving systems.
Figure 2:
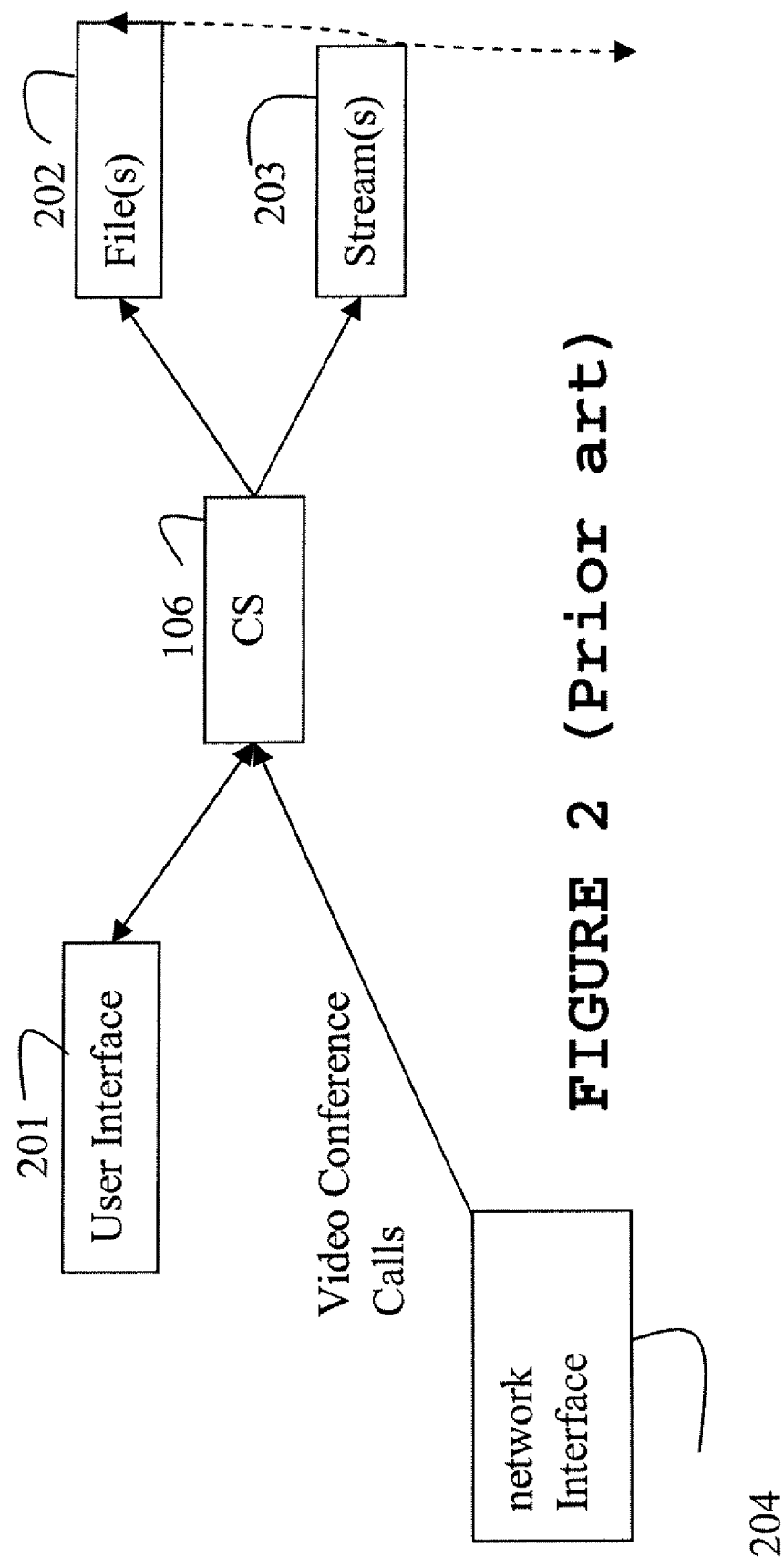
FIG. 2 is a block diagram illustrating a typical streaming and/or archiving system according to prior art.

FIG. 2 show video conferencing equipment connected to a typical packet based network. H.323 is an International Telecommunications Union (ITU) standard that provides specification for computers, equipment, and services for multimedia communication over packet based networks that defines how real-time audio, video and data information is transmitted. The H.323 standard specifies four kinds of components, which, when networked together, provide the point-to-point and point-to-multipoint multimedia-communication services:

1. terminals (101)
2. gateways (102)
3. gatekeepers (103)
4. multipoint control units (MCUs) (104)

H.323 Terminals are the endpoints on the LAN that provide real-time two way communications. Terminals are usually a personal computer (PC) or a stand alone-device (e.g. video conferencing endpoint). Gatekeepers are responsible for providing address translation between an endpoints current IP address and its various H.323 ID aliases, call control and routing services to H.323 endpoints, system management and security policies. An H.323 gateway provides connectivity between an H.323 network and a non-H.323 network (e.g. ISDN). Finally, the MCUs provide support for conferences of three or more H.323 terminals. Further a video conferencing streaming and/or archiving system (106) is connected.

Figure 3:
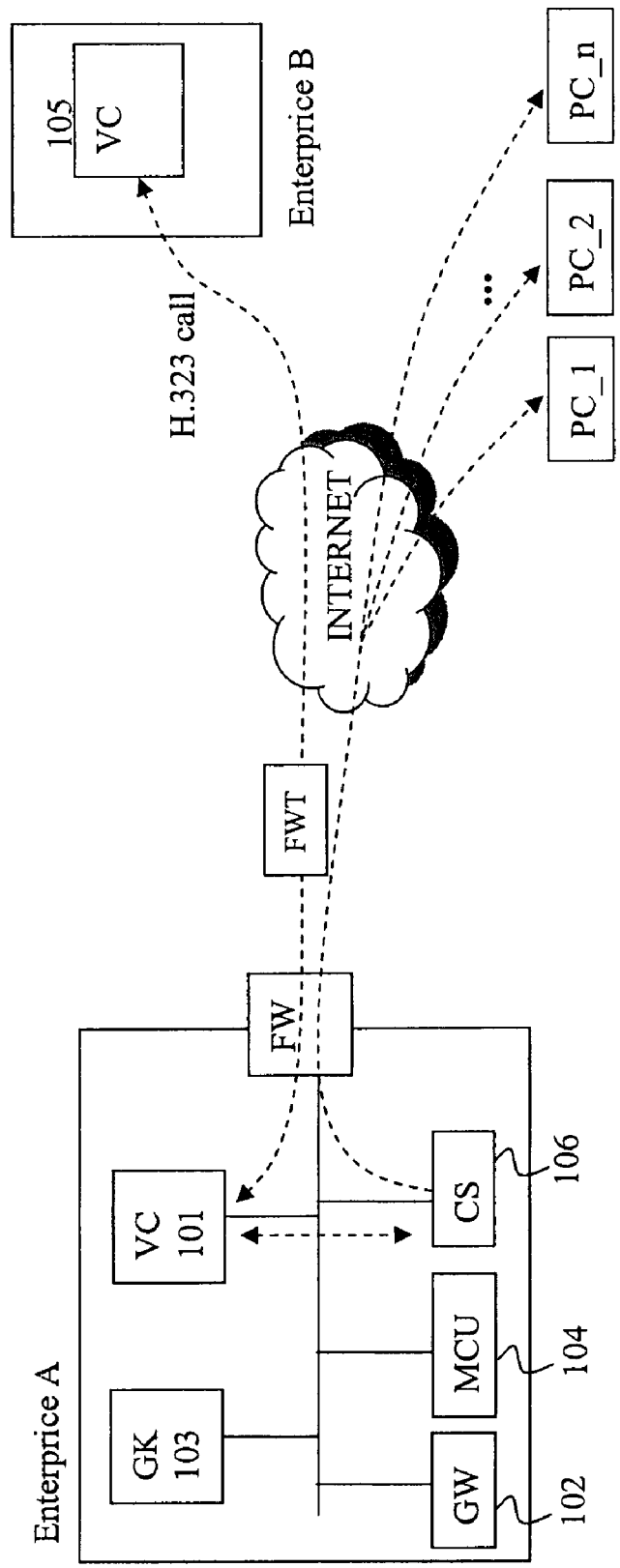
FIG. 3 is a block diagram illustrating a typical system architecture of audio and/or video conferencing equipment in a packet switched network.

As shown in FIG. 3, a video conferencing streaming and/or archiving system (106), hereafter referred to as a content server (CS), is preferably provided with a network interface (204) for connecting the device to a computer network, audio/video and presentation data interfaces for receiving conference content, a file conversion engine for converting presentation content into a standard image format for distribution, and a stream encoder for encoding the content into streaming format for distribution. The CS is further equipped with a stream server for transmitting (203) the encoded audio/video content and a web server for transmitting web pages and converted presentation content to terminals located at nodes of the network. The content server is also adapted to create archive files (202) consisting of the encoded stream data, residing at local storage media or in a server/database, to enable later on-demand distribution to requestors at remote terminals over the computer network. Further examples of a video conferencing streaming and/or archiving system (106) may be found in U.S. patent application Ser. No. 10/500,158, U.S. Pat. No. 7,136,577, and U.S. Pat. No. 6,590,603, the entire contents of each being hereby incorporated by reference. As noted previously, RTP and RTSP, as well as other existing or proposed streaming protocols are within the scope of the present invention.

According to one embodiment, the conference is initiated by including the content server (106) as a participant in the conference. The content server (106) accepts or places H.323 video calls as point-to-point (only one H.323 system in the call, typically used to record training materials from a single instructor) or multipoint (2-n H.323 systems in the call, typically used to stream or archive meetings). Viewers at remote terminals (PC_1-PC_n) can access a conference by directing a conventional web browser to an URL (Uniform Resource Locator) associated with the content server (106). After completion of validation data interchanges between the viewer and the distribution device, the viewer is able to view the personal interchange, i.e. the conversation and associated behaviour, occurring between the participants at the conference presenter site, as well as view the presentation content being presented at the conference site. The multimedia content is viewed in a multiple-window user interface through the viewer web browser, with the audio/video content presented by a streaming media player, and the presentation content displayed in a separate window. When requested by the head of the conference or by the conference management system, encoded stream data is stored in a server as an identifiable file (202).

As mentioned above, in order to produce streaming and recording outputs from a video conference, the content server (106) acts like a video conferencing endpoint (terminal). The CS (106) can join a point-to-point or a multipoint video conference just like any other endpoint, but instead of displaying the output on a screen like most regular video conferencing endpoints, it processes the data into other useful outputs.

As an endpoint the CS may also have one or more alias addresses associated with it. The alias addresses provide an alternate method of addressing the endpoint. These addresses include E.164 (network access number, telephone number, etc.), H.323 IDs (alphanumeric strings representing names, e-mail-like addresses, etc.), and any others defined in Recommendation H.225.0. Alias addresses are unique within a Zone, Domain, among Zones, and among Domains.

As discussed in the background section above, a CS is generally limited in the number of outputs it can create. To increase the number of outputs, additional devices must be added. Increasing the number of content servers consequently increases the complexity of managing and interacting with them. However, according to the present invention the individual standalone content servers are clustered together in such a way that the user experience is as if they were interacting with a single system, no matter how many systems are part of the cluster. In addition to this, administrative tasks can be performed in the same way for the cluster as for a single distribution device.

Figure 4:
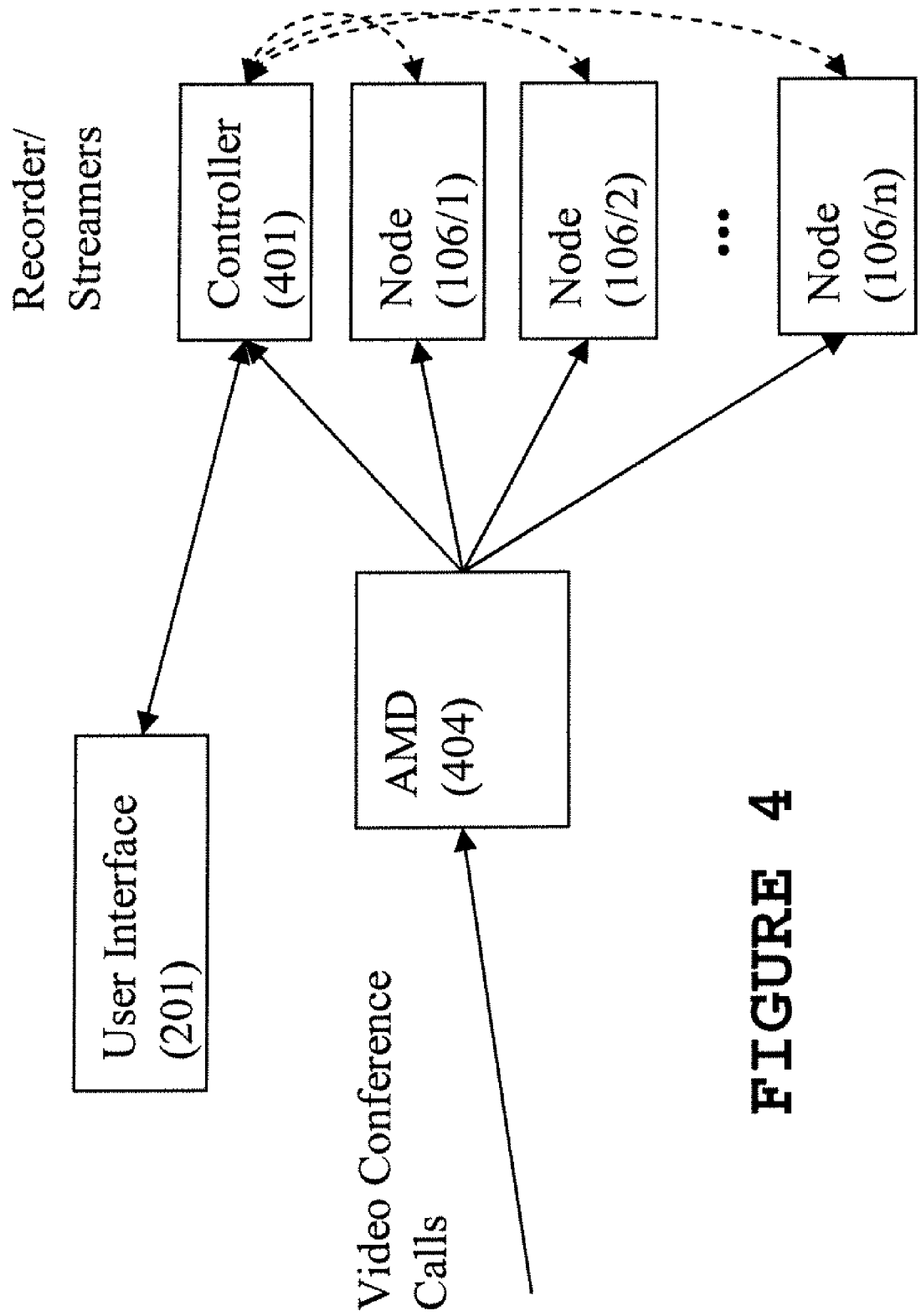
FIG. 4 is a block diagram illustrating typical system architecture of a content server cluster according to the present invention.

FIG. 4 is a schematic drawing of a content server cluster according to the present invention. Two or more content servers are joined to form a cluster, and in a cluster with m content servers (106), one of the CSs assumes the role of the cluster controller (401), while the remaining n=m−1 devices assumes the role of nodes (101/1-101/n). There are two main configuration files for the content servers, one for the web based user interface and one for the call handling unit. The cluster settings reside in the user interface's configuration file and describe the machines in a cluster, e.g. whether they are a node or a controller, and for the controller whether it can record and/or archive as well as just be the user interface. In one embodiment, some or all of the content servers in a cluster are initially identical. Changing the configuration file on a first content server in order to assign the first content server to be a node disables the user interface on the first content server. Further, changing the configuration file on a second content server in order to assign the second content server to be a controller configures the second content server to propagate the second content server's system settings to other nodes in the cluster. Consequently, the cluster controller (401) becomes the user's only point of interaction with the cluster, meaning that even though there are several devices in the cluster, only one interface (for device settings, recording and/or archiving and viewing streams/recordings, etc.) is provided. Further, editing administrative settings on the cluster controller (401) is effectively applying the settings for all nodes (101/1-101/n).

Further, the content server cluster according to the present embodiment includes a load balancing system. For incoming calls a load balancing unit (404) is introduced, its role being to direct incoming calls to the appropriate distribution device in the cluster in a controlled manner. The load balancing unit (404) may be a device or system designed specially for this purpose, or may be software implemented in SIP or the like. For outgoing calls, the User Interface application residing on the cluster controller (401) acts as a load balancer, keeping track of the amount of free resources in all of the CSs in the cluster and distributing the load accordingly.

The load balancing unit (404) will process incoming video conference call requests and make a decision about which content server to handle the call.

The term 'handle' means generally participating in a call with another video conference device (e.g., an endpoint.) This may include either a) receiving and accepting a call request from an endpoint or MCU and then receiving and sending media (note that a CS generally only receives media when in a call, with the received media then being streamed and/or recorded) and/or b) sending a call request to an endpoint and then exchanging media with that endpoint (as described below, a call may be initiated from the CS through the GUI). In handling a call, a CS may also authenticate and manage requests from clients who wish to receive the stream or view the recorded material. Handling also includes memory and streaming management. Handling also includes any encryption or password management associated with live or delayed streaming.

Since the desired outputs can be generated by any of the content servers in the cluster, it is arbitrary which content server that handles the call. Consequently, the result as the user sees it will be exactly the same as if a single device was involved in the interaction.

According to one embodiment of the present invention, an H.323 gatekeeper is used as the load balancing unit (404) depicted in FIG. 4. As discussed above, a gatekeeper (103) is a network device that provides addressing service for H.323 videoconference devices. Use of a gatekeeper (103) allows a videoconference device to "dial" another device using the videoconference alias rather than an IP address (which could be changed in accordance with Dynamic Host Configuration Protocol (DHCP) or another protocol). In order for a gatekeeper (103) to know where to direct a call, terminals (101) and gateways (102) must register with the gatekeeper (103), informing the gatekeeper (103) of their present IP addresses and their associated aliases. The called endpoint's E.164 address may consist of an optional service prefix followed by the E.164 alias. In one embodiment, the service prefix consists of n digits from the set of 0 to 9, * and #, where n is a predetermined number of digits. One purpose of such a service prefix might be to request access to a Gateway. The Gatekeeper may alter this address prior to sending it to the destination.

According to the present invention, the content servers (401; 106/1-106/n) register with its local gatekeeper (103) as gateways with one or more service prefixes and/or suffixes.

By doing this, all calls directed to an address starting with one of the registered service prefixes, or ending with one of the registered service suffixes, are forwarded to said content server by the gatekeeper, regardless of the remaining digits (or alphanumeric characters) in the address. Further, all the content servers register with the gatekeeper with the same prefix and/or suffix, e.g. 212XXXXX (that is, any address beginning with 212 and followed by 5 arbitrary digits). Consequently, when a call request arrives at the gatekeeper with a receiver identification (called address) containing one of the prefixes or suffixes (e.g. 21255511), the gatekeeper knows that the call is to be routed to one of the registered content servers. Which content server the call request is sent to depends on available capacity and registration order. The remaining alphanumerical characters in the address can be used for other control purposes (e.g., to tell the CS which streaming and/or archiving settings to use when streaming and/or archiving the call.) The addressing problem discussed in the background section is thus removed, because all nodes have identical aliases.

Most gatekeepers implement some form of capacity indication, where devices registered as a gateway with the gatekeeper inform the gatekeeper about the amount of resources they can handle. Most conventional gatekeepers support an "out of resources" indication, telling the gatekeeper that a gateway has no more resources available, and therefore cannot receive any further calls. If there are multiple systems registered to the gatekeeper with the same gateway prefix, the gatekeeper uses the capacity indication function to make a decision about which system will handle the incoming call. As mentioned above, there is a limit to how many simultaneous video conference calls the CS can handle. This number is inversely related to the complexity of the recording/streaming task. Since it is impossible to know in advance how many resources a call will demand, the CS is configured to accept only a certain number (n) of calls, wherein said number (n) typically lays in the region between 2 and 10. Therefore, according to one embodiment, the content servers are configured to send a "out of resources" indication to the gatekeeper if the number (m) of ongoing calls is equal to the maximum allowed number (n) of calls. If one of the content servers (401; 106/1-106/n), has signalled "out of resources" to the gatekeeper, the gatekeeper will route the call to another CS in the cluster with available resources. Usually, the gatekeeper will forward the call to the gateway/CS that registered first. If this gateway/CS has sent a "out of resources" message to the gatekeeper, the second registered gateway/CS is next in line, and so on. If one or more of the ongoing calls is terminated such that the number (m) of ongoing calls is less than the maximum allowed number (n) of calls in the CS, the CS sends a "free recourses" indication to the gatekeeper.

Ideally, the gatekeeper should have more detailed information about a gateway's capacity, e.g. total resources and amount of used resources at all times, not only when a gateway is out of resources.

Figure 5:
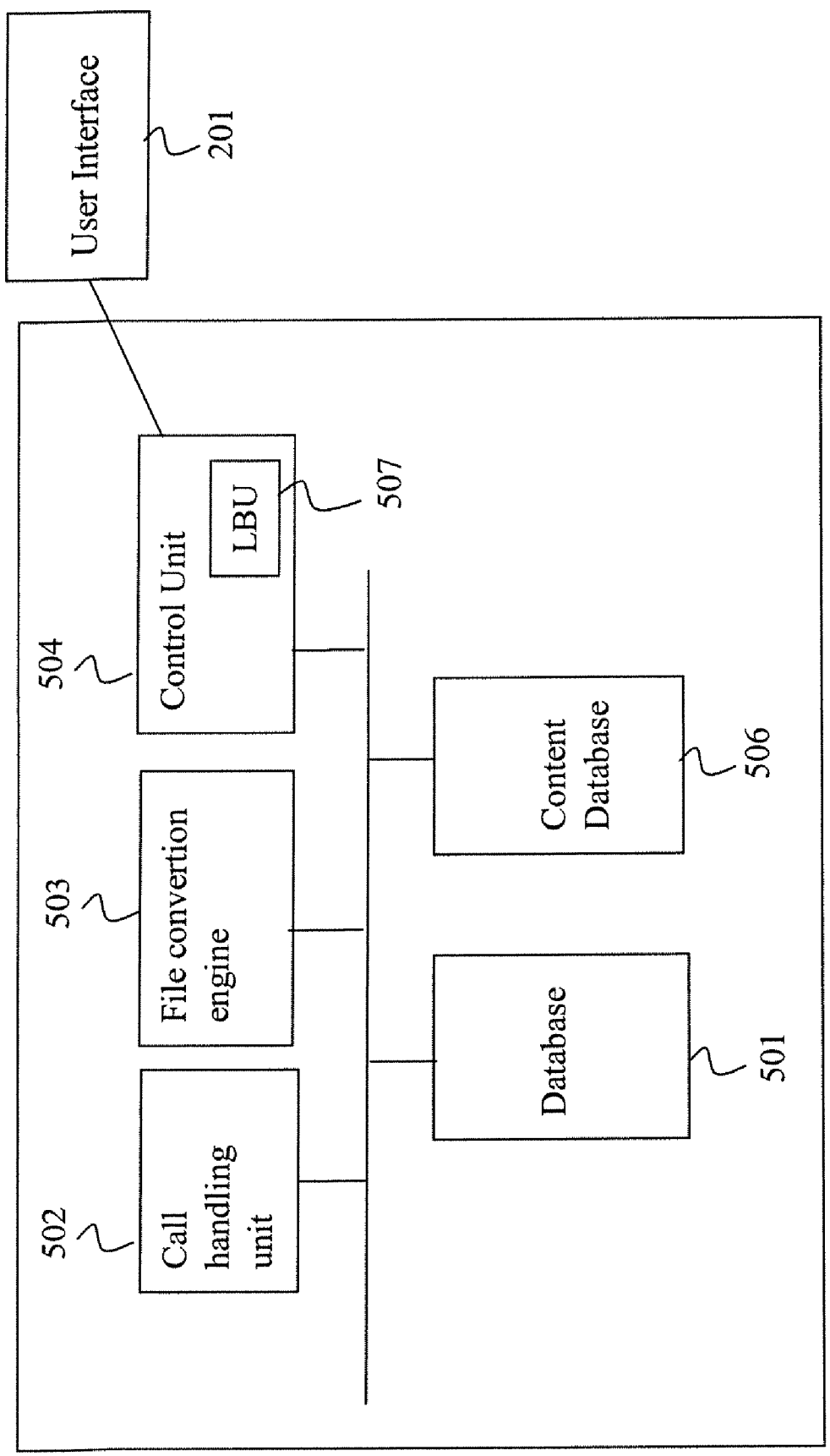
FIG. 5 is a block diagram illustrating typical system architecture of a cluster controller.

As mentioned above, calls may also be initiated from the content server cluster, through a "create conference" option in the user interface (201). FIG. 5 is a block diagram illustrating a content server according to the present invention, set to be a cluster controller (401). When a call is initiated from the cluster, the load balancing unit (507) residing on a control unit (504) determines which content server will handle the call. In order to do this, the load balancing unit (507) requires knowledge about the current capacity of all the content servers (106) in the cluster. Therefore, an application programming interface (API) call is used to gather capacity information from each device. A conventional list of API functions can be called via Simple Object Access Protocol (SOAP) to interact with the content servers, e.g. make a call, end a call, get system information, etc. One of these conventional API functions is a "GetCallCapacity" function, which requests a given content server to return the maximum number of calls and the number of calls currently in progress for the given CS. When a user initiates a call from the interface (201), the load balancing unit (507) requests all the content servers (401; 106/1-106/n) in the cluster for their call capacity. The content servers reply to the request with a capacity status report. Once the load balancing unit (507) has analysed the capacity information, the load balancing unit (507) can make a decision, hence spreading the load around the cluster evenly. According to one embodiment, less or no load is applied to the cluster controller (401) until the nodes (106/1-106/n) are under full load. Since the user interface only interacts with the cluster controller (401), applying minimal load to the cluster controller (401) means that the interface can remain responsive throughout.

Figure 6:
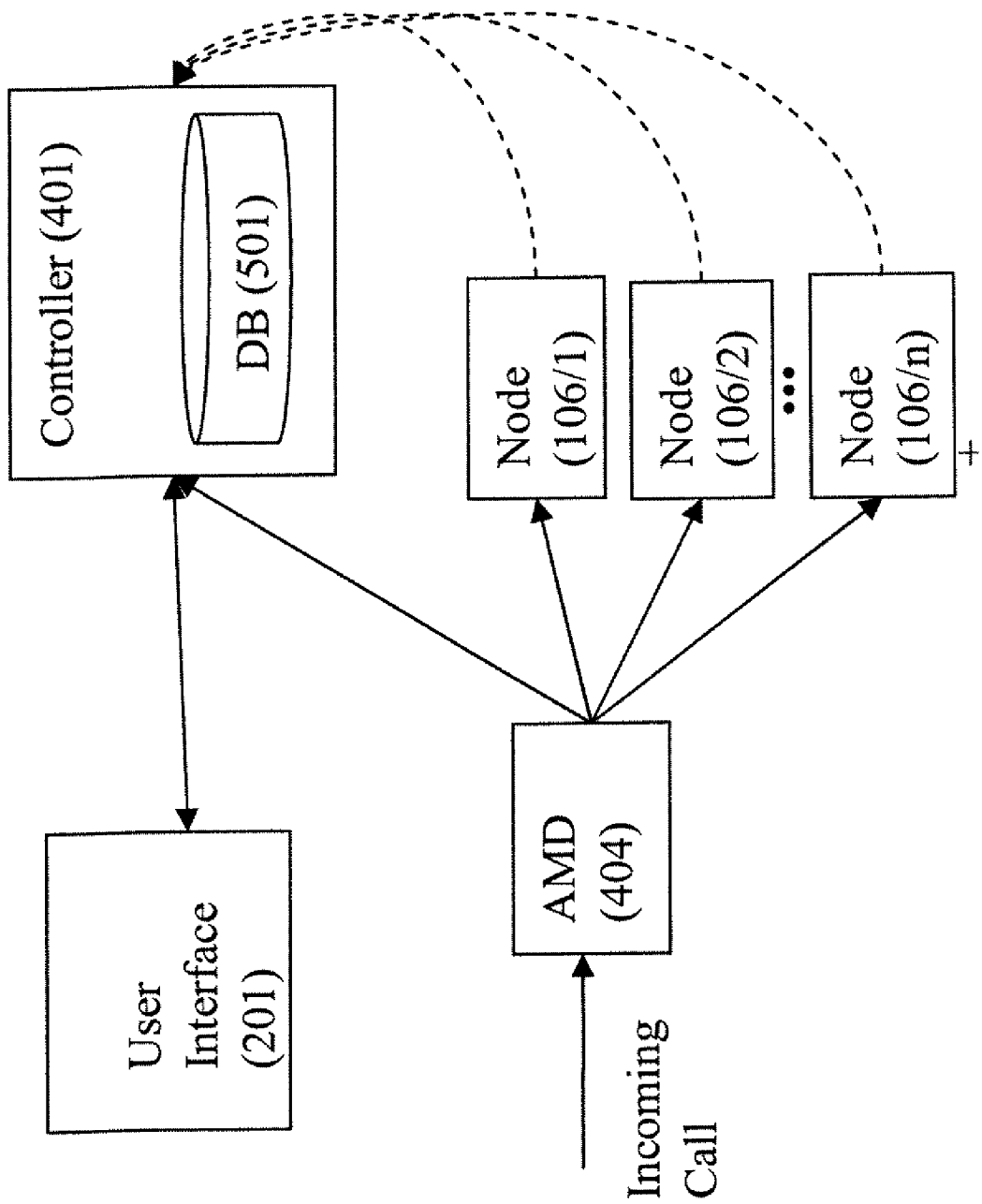
FIG. 6 is a block diagram illustrating typical system architecture of a content server cluster according to one exemplary embodiment of the present invention.

FIG. 6 is a block diagram illustrating one exemplary embodiment of the present invention. When a conference call is recorded or streamed on one of the content servers in the cluster, the multimedia streams are converted into files (202) of preferred format and are stored on the content server handling the call. When a conference call starts, information about the initial conference recordings is written to a database (501) in the cluster controller (401), hereafter referred to as the content library. The content library contains information used by the control unit to identify where a recorded conference is stored in the cluster. Information about recordings that are being streamed live is written to the content library when the call commences, and is deleted when the call ends. Information about recordings that can be accessed on demand is written to and kept in the content library. The information to be stored in the content library is represented by dashed lines. The control unit is configured to interact with the content library using API calls, both writing to the content library and reading from the content library. A conference initially has one recording associated with it, which contains the following information: ConferenceID, RecordingID, Title, UpdateTime and Deleted. This information is used to relate a conference to its movies and still images. A recording can have multiple movies and still images connected to it. For each movie, multiple parameters are stored in the content library, including at least RecordingID, Type, Bandwidth, DateTime, is Dual etc. Further, for each still image or snapshot, the following information is stored in the content library: RecordingID, movieTime, URL, Action, Description, UpdateTime and Deleted. The control unit uses this information stored in the content library for each recording, to construct Uniform Resource Locator (URL) for the user so that they can access the content and then view it using the user interface. The cluster controller can also optionally act as a recorder/streamer, but this will put extra load on the cluster controller and may have effect on the cluster controller's primary task (e.g., serving the user interface application and content library) making it slower. The cluster nodes act as recorders/streamers.

Figure 7:
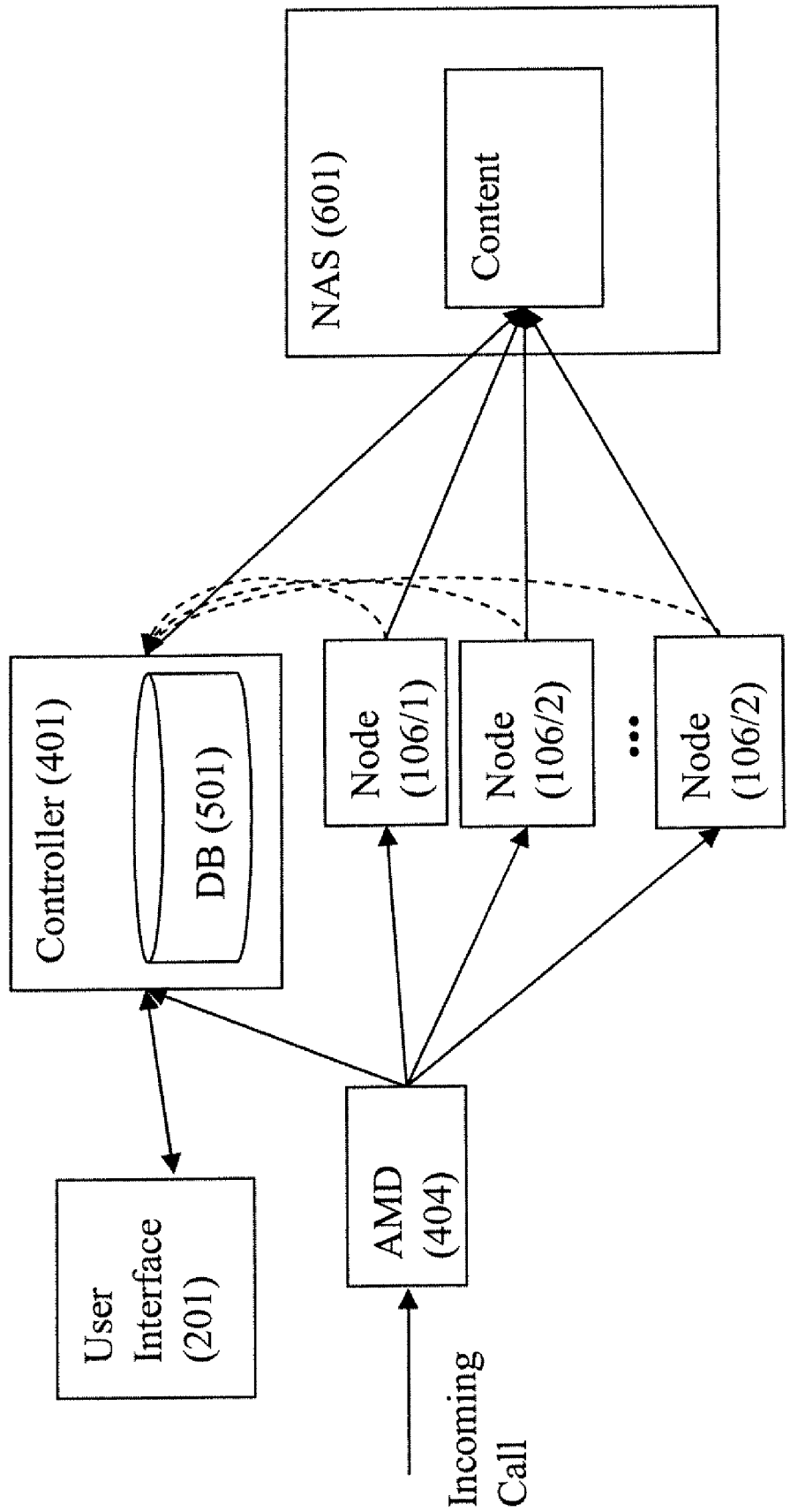
FIG. 7 is a block diagram illustrating typical system architecture of a content server cluster according to another exemplary embodiment of the present invention.

FIG. 7 is a block diagram illustrating a second exemplary embodiment of the present invention. In this second exemplary embodiment, the recording information is still stored in the content library on the cluster controller (401), but instead of storing the content on the content servers, a network attached storage (NAS) is used. The NAS has its own redundancy and data protection built in. The content servers save all their recordings to the NAS, but save all the information regarding the recording to the content library as in the previous example.

The content server cluster is created by means of a setup wizard that guides the user through the process. In order to create a new cluster, the user must have administrative access to all the distribution devices designated for the new cluster. One of the distribution devices (101) is selected to operate as a cluster controller (401). The user starts the wizard on the designated controller device (401) and supplies the installation wizard with the IP addresses of the intended nodes. For security reasons, before the controller can interact with the nodes in any way, the administrator must explicitly allow this from each node. Therefore, the setup wizard provides a link to a Graphical User Interface (GUI) for each node where the user can select whether to allow the node to be added to a cluster. This setting can only be changed by users with administrative access. FIGS. 9A-9D are screen shots of a GUI according to one embodiment of the invention.

The wizard analyzes the designated controller and all designated nodes to determine if the cluster can be created. Conditions to be verified: whether or not all distribution devices are of the same version; whether the nodes have granted permission to the controller to add them to the cluster; and whether the licensing (number of allowed calls) is the same. If all these conditions are met, the cluster can be successfully created. In other embodiments, different conditions may be used.

If the cluster is created successfully, the user is presented with a cluster setting screen. In one embodiment, the cluster setting screen is identical to the settings screen of an individual device. The displayed settings apply for multiple systems in the cluster which will be propagated to the nodes (101/1-101/n) from the controller device (401). In addition to this, settings for call addresses and how to setup call outputs may be propagated from the controller to the nodes.

In one embodiment, the controller device (401) becomes a single point of interaction to the entire cluster. In this embodiment, events that occur on the controller device (401) also occur on the cluster. It is also possible to manage the cluster itself after it has been created. E.g., nodes may be added and removed at any time using the wizard or a customised version of the wizard residing on the controller device.

Users attempting to access a node via the web, using an IP-address or alias, are directed to the cluster controller's interface. Administrative access is still permitted on nodes but only for the settings which apply only to the local device. These local settings may also be altered for the individual nodes from the cluster controller's interface.

The following describes a specific example of the preceding embodiments.

The Clustering feature of this example allows up to five Content Servers to be 'stacked together' and controlled from a single user interface. In other examples, more or less than five Content servers may be 'stacked.' In each cluster, one Content Server is nominated to be the 'Controller', which controls the administrative settings for the whole cluster and provides the user interface to Live and Recorded content. Other Content Servers in the cluster, known as Nodes, use the settings propagated from the Controller and function as 'Recorders' for content.

The Cluster allows users to make multiple concurrent calls, based on the option keys installed on all the Content Servers which are part of the cluster. For example, if the Cluster consists of five Content Servers which have option keys installed for transcoding and archiving calls, and if the Controller is set to the Library/Recorder function, it is possible to make twenty five concurrent calls to or from the cluster. If the Controller is set to the Library Only function, it is possible to make twenty concurrent calls to or from the cluster.

Before running a Cluster Wizard, a user will use a GUI similar to the one shown in FIGS. 9A-9D to check that:
  All Content Servers to be added to a cluster are all at the same version and build number. Check the build number at the bottom right of the screen of each Content Server to be added to the cluster;
  All Content Server nodes to be added to a cluster are not registered to the gatekeeper;
  In a cluster the only option on the Controller for Gatekeeper registration is Gateway.
  All Content Servers to be added to a cluster have the same API password;
  All Content Servers to be added to a cluster have the same type of option keys installed.

To add one or more Content Servers to a cluster, a user uses an item Cluster Settings in an Administrator Settings Menu to execute the following steps:
  Step 1—Select the Role of the Controller in the Cluster.
  Library only—will not be used to record or stream conferences but only to store the Conference Library information.
  Library/Recorder—will be used to record and stream conferences as well as storing the Conference Library information.
  Nodes: Enter the IP Address, System Name and E.164 Alias of the first Content Server to add to the Cluster.
The user clicks an Add button to add more than one node to the Cluster; clicks a Next button once all the Nodes have been added to the Cluster; and clicks a Remove button at the end of a Node that the user does not wish to add at this time.
  Step 2—Click on each Content Server Node to get permission to add it to the cluster. A new window will open for each Node, seeking permission to add it to the Cluster. Click the Allow button for each node to add to the cluster or click the Do NOT Allow button if this Content Server is not to be added to the cluster. Click the Close Window button to return to the Wizard on the Controller. Repeat this step for each Node to be added to the cluster. When all Nodes have been verified to add into the cluster, click on the Next button.
  Step 3—Analyze the nodes to make sure that they can be added to the cluster. If the node or nodes can be added to the cluster successfully, the user can proceed by clicking the Next button. If not, the user will click the Back button and remove the node or correct the problem that is not allowing the node to be added and try again. This node will not work in the cluster as the build number is different.
  Step 4—Review Site Settings on the Controller. Any changes made here will be propagated to the nodes. Click the Next button after any changes have been made on the clusters controller.
  Step 5—Click the Next button to add the displayed Content Servers into the cluster. Click the Back button to change the settings made up to this point. This screen is to notify that the site settings, call configurations, templates and recording aliases from the controller have been copied to each of the nodes. Click the finish button if success has occurred to finish the process.
  Step 6—Once two or more Content Servers are in a Cluster, and the Cluster Settings screen will now display the cluster information, as below.
    Click the Modify Cluster button to make changes to the Cluster.
    Click the Add Node button to add another Node to the Cluster.

Click the Remove Node button to remove a node from the Cluster.

When an Owner or Administrator is making a call from the interface, the Current Transcoding and Archiving Calls will now be updated to reflect the number of Content Servers on the cluster and whether the Controller is a Library or a Recorder and a Library.

Removing a Node from the Cluster involves the following steps: On the Controller, a Cluster Settings screen will be presented. Click the Remove Node button to begin the process.

Step 1—Select the check box next to the Content Server to be removed from the Cluster.

Step 2—Click the Next button to continue to the next step where the Site Settings, Call Configs, Templates and Recording Aliases are copied from the Controller to the removed nodes. The GUI will now show that the node has been removed.

Modifying the Cluster Settings involves the following steps: Click the Modify Cluster button to make changes to the existing cluster. Make changes to the Cluster and click the Next button. The nodes will be analysed and if successful click the Next button to proceed. The Site Settings, Call Configs, templates and Recording Aliases will be copied from the Controller to each of the Nodes.

Figure 8A:
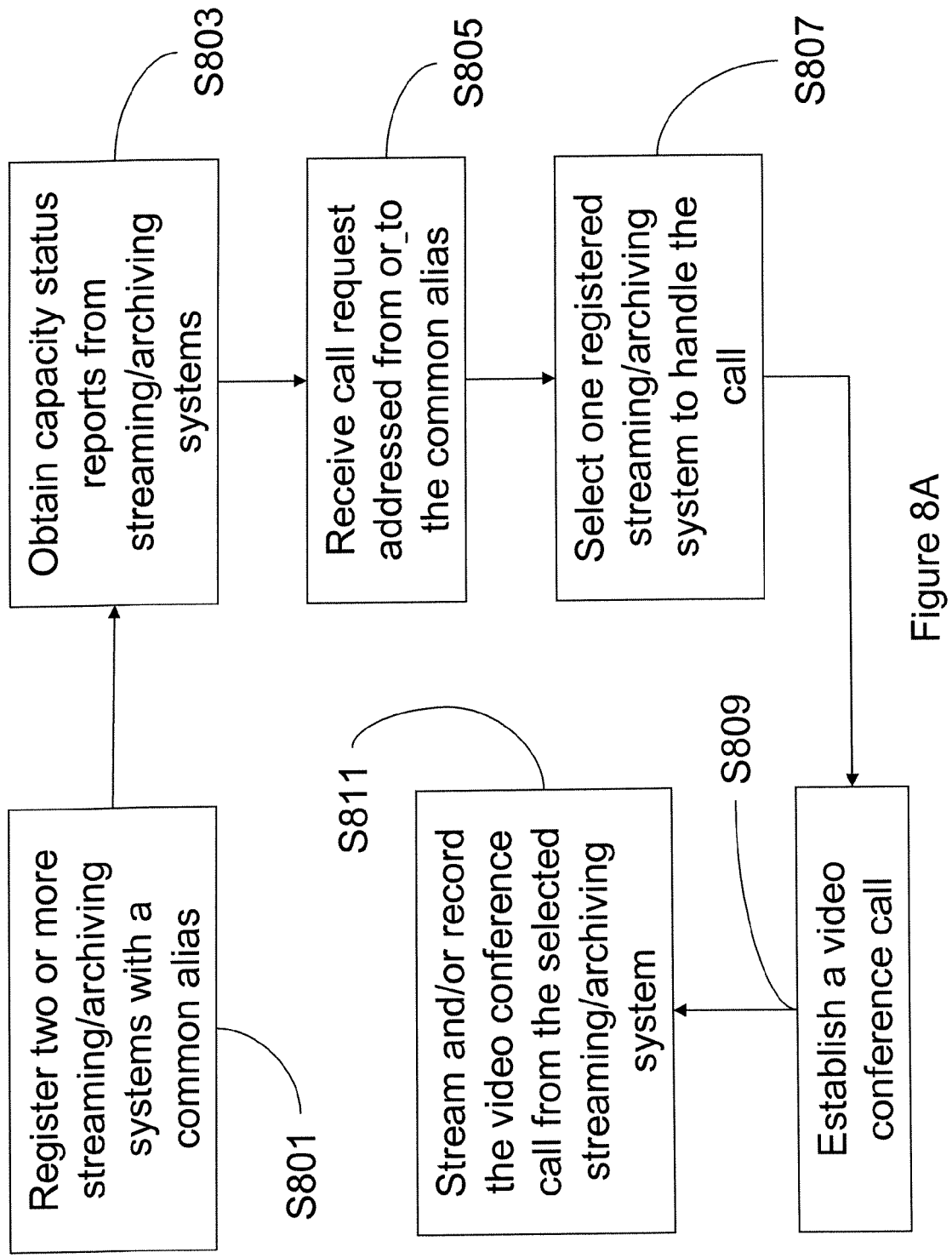
FIGS. 8A-8B are a flow charts of a method of one embodiment of the invention.

In summary, one embodiment of the invention includes the method shown in FIG. 8A for providing scalability in two or more streaming and/or archiving systems for video conference calls and operatively connected over a packet switched network. The method includes registering the two or more streaming and/or archiving systems with an address management unit with at least one common alias to form a corresponding two or more registered streaming and/or archiving systems (S801), sending a capacity status report from the two or more streaming and/or archiving system to the address management unit at a first predefined event (S803), and if a call request for a call, addressed from or to the at least one common alias, is received at the address management unit (S805), selecting one of the two or more registered streaming and/or archiving system to handle the call, based on the capacity status report, to identify a selected streaming and/or archiving system (S807), establishing a video conference call between the selected streaming and/or archiving system and one or more video conference devices, the one or more video conference devices including one of an endpoint and a multipoint control unit (MCU) (S809), and streaming and/or recording the video conference call using the selected streaming and/or recording system (S811).

Figure 8B:
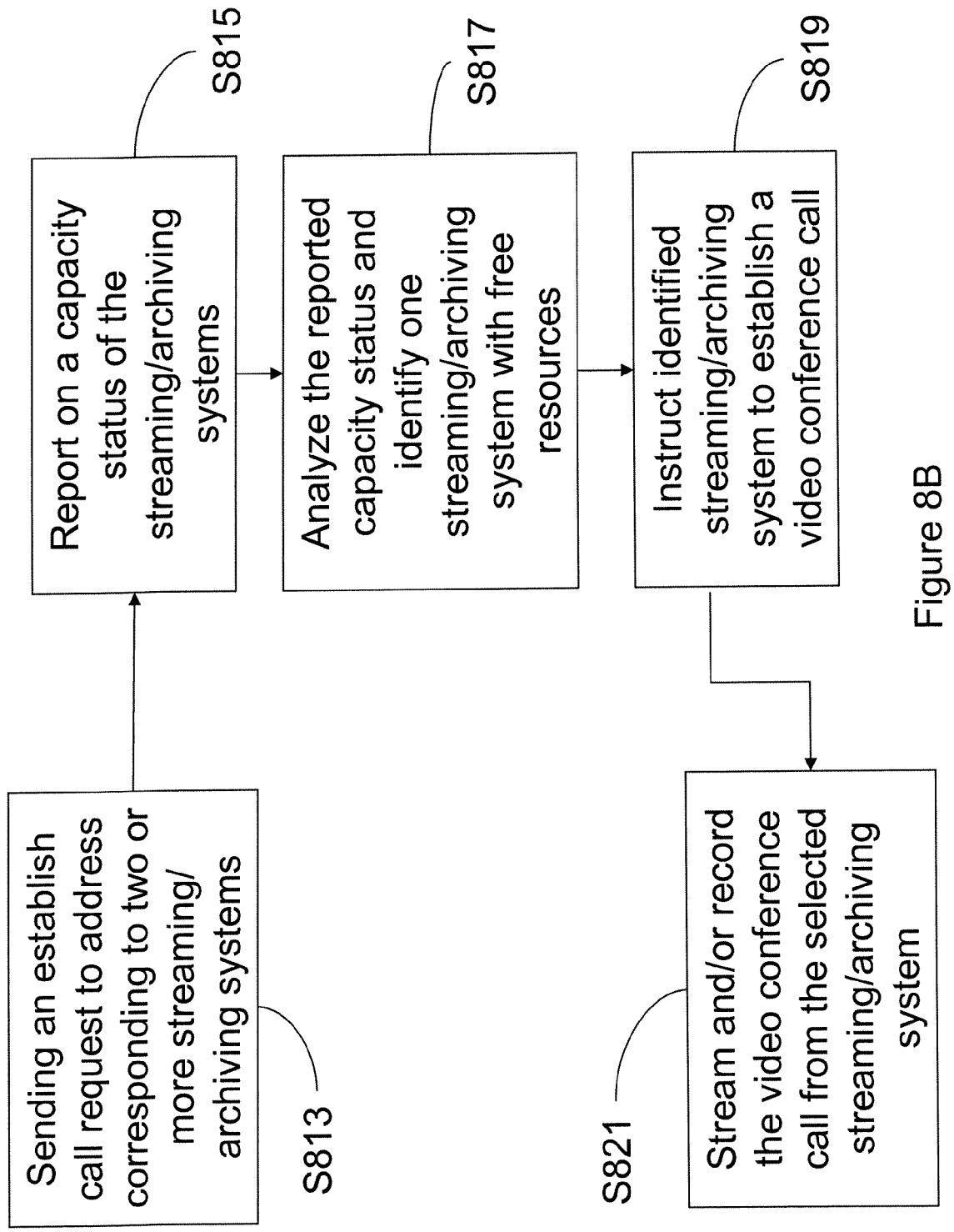
Figure 9A:
Figure 9B:
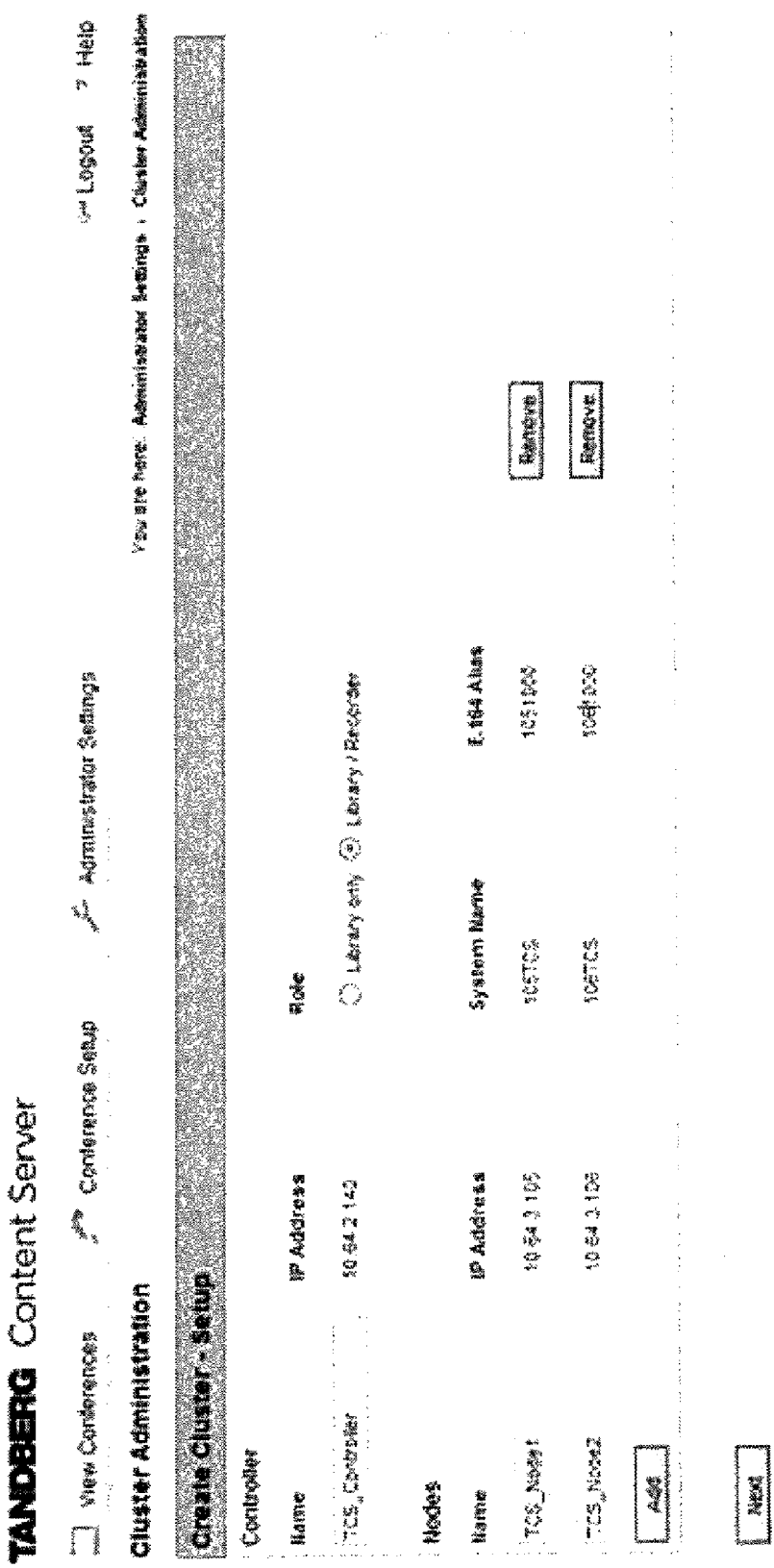

In summary, one embodiment of the invention includes the method shown in FIG. 8B for providing scalability in two or more streaming and/or archiving systems for video conference calls and operatively connected over a packet switched network. The method includes sending an establish call request from a user interface provided by a system control device, the establish call request containing at least one receiver identification (S813), sending a capacity status request to the two or more streaming and/or archiving systems from a load balancing unit residing on the system control device, receiving a capacity status report from the two or more streaming and/or archiving systems, and analysing the capacity status report (S815) and identifying one of the two or more streaming and/or archiving systems with free resources (S817), instructing the identified streaming and/or archiving systems to establish a video conference call with one or more conference devices corresponding to the at least one receiver identification (S819), and streaming and/or recording said video conference call using said selected streaming and/or recording system (S821).

The invention may be implemented in software, so as to cause a processor-based device to execute the methods described previously. A tutorial on how computers and related devices operate may be found in "How Computers Work, Millennium Edition," by Ron White, 1999, Que Publications, Macmillan Computer Publishing, USA.

The present invention is not limited to these embodiments, as various variations and modifications may be made without departing from the scope of the present invention.

The invention claimed is:

1. A system configured to provide scalability in two or more video conference streaming or archiving systems for video conference calls and operatively connected over a packed switched network, comprising:
    said two or more streaming or archiving systems having at least one common alias for receiver and sender identification, and each of said two or more streaming or archiving systems provides a graphical user interface that enables a user to select whether to allow a streaming or archiving system to be added to a cluster;
    a system control device including a control unit and a database, wherein the system control device is configured to
        provide a user interface,
        determine whether the cluster may be created from the two or more streaming or archiving systems based on whether each of the two or more streaming or archiving systems have been granted permission to be added to the cluster, and
        at a first predefined event, propagate system settings or parameters to said two or more streaming or archiving systems; and
    a load balancing system connected to said two or more streaming or archiving systems and to said system control device via a network, the load balancing system configured to
        receive a capacity status report from at least one of said two or more streaming or archiving systems at a second predefined event, and
        select one of said two or more streaming or archiving systems to stream or record a video conference call, based on said capacity status report.

2. The system according to claim 1, wherein one of said two or more streaming or archiving systems is said system control device.

3. The system according to claim 1, wherein said load balancing system comprises:
    an address management unit configured to receive a call request from a video conference device using said at least one common alias as receiver identification or send a call request to said video conference device using said at least one common alias as sender identification, said video conference device being one of an endpoint or a multipoint control unit (MCU).

4. The system according to claim 1, wherein said load balancing system comprises:
    a load balancing unit residing on said control unit and configured to handle an establish call request from said user interface.

5. A system according to claim 3, wherein said load balancing system further comprises
    a load balancing unit residing on said control unit and configured to handle establish call requests from said user interface.

6. The system according to claim 3, wherein
said two or more streaming or archiving systems are further configured to register with said address management unit using said at least one common alias to create two or more registered streaming or archiving systems, and send said capacity status report to said address managing unit at said second predefined event, and
said address management unit is further configured to
when receiving or sending said call request including said at least one common alias, select one of said registered two or more streaming or archiving systems to handle the call request, based on said capacity status report, to identify a selected streaming or archiving system, and
forward said call request to said selected streaming or archiving system.

7. The system according to claim 4, wherein said load balancing unit is further configured to
send said capacity request to said two or more streaming or archiving systems upon receiving said establish call request from said user interface,
receive said capacity status report from said two or more streaming or archiving systems,
select one of said two or more streaming or archiving systems to be a selected streaming or archiving system, and
instruct the selected streaming or archiving system to establish the video conference call with one or more conference devices as defined in said established call request.

8. The system according to claim 1, wherein said at least one common alias is stored in said database and where said first predefined event comprises one of:
a change to a system setting, and
a change to said at least one common alias stored in the database.

9. The system according to claim 3, wherein said two or more streaming or archiving systems are configured to, at said second predefined event,
send an out-of-resources report to said address management unit when used streaming or recording resources exceed a preset out-of-resources threshold, and
send a free-resources report to said address management unit if used streaming or recording resources fall below a preset free-resources threshold.

10. The system according to claim 9, wherein said address management unit is a video conference gatekeeper, and wherein said two or more streaming or archiving systems are registered with said video conference gatekeeper as video conference gateways with having a common service prefix or service suffix.

11. The system according to claim 1, wherein said system control device is further configured to
receive recording or streaming file information from said two or more streaming or archiving systems when a streaming or recording task commences, said file information identifying recorded media files, and
store said file information in said database.

12. The system according to claim 11, wherein said control unit is further configured to construct a Uniform Resource Locator (URL) for each recording or stream using said stored file information, and propagate said URL to said user interface on request.

13. A method for providing scalability in two or more streaming or archiving systems for video conference calls and operatively connected over a packet switched network, comprising:

registering said two or more streaming or archiving systems with an address management unit with at least one common alias to form a corresponding two or more registered streaming or archiving systems,
sending a capacity status report from said two or more streaming or archiving system to said address management unit at a first predefined event, and
if a call request for a call, addressed from or to said at least one common alias, is received at said address management unit,
selecting one of said two or more registered streaming or archiving system to handle the call, based on said capacity status report, to identify a selected streaming or archiving system,
establishing a video conference call between said selected streaming or archiving system and one or more video conference devices, said one or more video conference devices including one of an endpoint and a multipoint control unit (MCU), and
streaming or recording said video conference call using said selected streaming or recording system.

14. The method according to claim 13, wherein said address management unit is a gatekeeper.

15. The method according to one of the claim 13, wherein said step of sending a capacity status report at a first predefined event comprises:
sending an out-of-resources report to said address management unit if used streaming or recording resources exceed a preset out-of-resources threshold, and
sending a free-resources report to said address management unit if used streaming or recording resources are below a preset free-resources threshold.

16. The method according to claim 13, wherein the step of streaming or recording a conference call comprises:
receiving file information from said selected streaming or archiving system when a streaming or recording task commences, wherein said file information identifies recorded media files, and
storing said received file information in said database.

17. The method according to claim 16, wherein the step of streaming or recording a conference call further comprises:
constructing a Uniform Resource Locator (URL) for each recording or stream using said stored file information, and
propagating said URL and conference information to said user interface.

18. A method for providing scalability in two or more streaming or archiving systems for video conference calls and operatively connected over a packet switched network, comprising:
sending an establish call request from a user interface provided by a system control device, said establish call request containing at least one receiver identification,
sending a capacity status request to said two or more streaming or archiving systems from a load balancing unit residing on said system control device,
receiving a capacity status report from said two or more streaming or archiving systems,
analysing said capacity status report and identifying one of said two or more streaming or archiving systems with free resources,
instructing said identified streaming or archiving systems to establish a video conference call with one or more conference devices corresponding to said at least one receiver identification, and
streaming or recording said video conference call using said selected streaming or recording system.

19. The method according to claim 18, wherein the step of streaming or recording a video conference call comprises:
- receiving file information from said identified streaming or archiving system when a streaming or recording task commences, wherein said file information identifies recorded media files, and
- storing said received information in said database.

20. The method according to claim 19, wherein the step of streaming or recording a video conference call comprises:
- constructing a Uniform Resource Locator (URL) for each recording or stream using said stored file information, and
- propagating said URL and conference information to said user interface.

21. A non-transitory computer readable storage medium encoded with instructions, which when executed by a processor based device cause the processor based device to execute a method for providing scalability in two or more streaming or archiving systems for video conference calls and operatively connected over a packet switched network comprising:
- registering said two or more streaming or archiving systems with a gatekeeper with at least one common alias to form a corresponding two or more registered streaming or archiving systems,
- sending a capacity status report from said two or more streaming or archiving system to said gatekeeper at a first predefined event, and
- if a call request, addressed from or to said at least one common alias, is received at said gatekeeper,
  - selecting one of said two or more registered streaming or archiving system to handle the call, based on said capacity status report, to identify a selected streaming or archiving system,
  - establishing a video conference call between said selected streaming or archiving system and one or more video conference devices, said one or more video conference devices including one of an endpoint and a multipoint control unit (MCU), and
  - streaming or recording said video conference call using said selected streaming or recording system.

22. A non-transitory computer readable storage medium encoded with instructions, which when executed by a processor based device cause a processor based device to execute a method for providing scalability in two or more streaming or archiving systems for video conference calls and operatively connected over a packet switched network comprising:
- sending an establish call request from a user interface provided by a system control device, said establish call request containing at least one receiver identification,
- sending a capacity status request to said two or more streaming or archiving systems from a load balancing unit residing on said system control device,
- receiving a capacity status report from said two or more streaming or archiving systems,
- analysing said capacity status report and identifying one of said two or more streaming or archiving systems with free resources,
- instructing said identified streaming or archiving systems to establish a video conference call with one or more conference devices corresponding to said at least one receiver identification, and
- streaming or recording said video conference call using said selected streaming or recording system.

23. The system according to claim 1, wherein the system control device determines whether the cluster may be created from the two or more streaming or archiving systems based on whether all of the two or more streamlining or archiving devices are a same version and have a same number of allowed calls.

* * * * *